United States Patent [19]
Burger

[11] Patent Number: 5,589,087
[45] Date of Patent: Dec. 31, 1996

[54] PROCESS FOR PRODUCING A STEEL MOLD FOR CONCRETE PAVING BLOCKS WITH SPACERS

[75] Inventor: Guenter Burger, Allmendingen, Germany

[73] Assignee: Rampf Formen GmbH, Allmendingen, Germany

[21] Appl. No.: 397,672

[22] Filed: Mar. 2, 1995

[30] Foreign Application Priority Data

Mar. 8, 1994 [DE] Germany ............... 44 07 698.3

[51] Int. Cl.$^6$ ............... B23K 11/14; B29C 33/40
[52] U.S. Cl. ............... 219/93; 219/76.17; 219/117.1; 264/219
[58] Field of Search ............... 219/93, 76.1, 76.17, 219/117.1; 264/219

[56] References Cited

U.S. PATENT DOCUMENTS

| | | | |
|---|---|---|---|
| 2,179,693 | 11/1939 | Goldstein | 219/120 |
| 2,326,806 | 8/1943 | Shmurak | 219/93 |
| 2,447,012 | 8/1948 | Hayes | 219/93 |
| 3,193,659 | 7/1965 | Schaus | 219/93 |
| 3,334,857 | 8/1967 | Liptrap | 249/119 |
| 3,891,821 | 6/1975 | Evertz | 219/76.12 |
| 4,249,358 | 2/1981 | Thieffry | 264/297.4 |
| 4,274,284 | 6/1981 | Mullins | 425/253 |
| 5,220,148 | 6/1993 | Aoyama . | |

FOREIGN PATENT DOCUMENTS

| | | |
|---|---|---|
| 3425620 | 1/1986 | Germany . |
| 3434746 | 3/1986 | Germany . |
| 3937662 | 5/1991 | Germany . |
| 4318908 | 8/1994 | Germany . |
| 848214 | 7/1981 | U.S.S.R. . |

OTHER PUBLICATIONS

Wallace, Stanley, A.: Designing, Tooling, and Applications. In: Resistance Welding, New York, 1950, pp. 206–222.

Rodon, Guenter: Technischer Stand der Einbauformen fuer Betonsteinfertigungsautomaten. In: Betonwerk + Fertig–teil–Technik, vol. 2/1979, pp. 71–74.

*Primary Examiner*—Teresa J. Walberg
*Assistant Examiner*—J. Pelham
*Attorney, Agent, or Firm*—Spencer & Frank

[57] ABSTRACT

The process described serves for producing a steel mold for concrete paving setts with so-called spacers, the individual mold chambers being cut out of a steel plate by flame cutting. Grooves are formed in the mold walls by means of the flame-cutting jet, by way of an arcuate movement of the same, the grooves defining the cross section of the spacers. The upper section of the grooves is filled in that closure platelets, of which the cross section corresponds approximately to the cross section of the groove and which exhibit welding projections on their side directed towards the groove, are welded into the groove by projection welding. The closure platelets consist of a strain-hardened unalloyed or low-alloyed steel.

9 Claims, 3 Drawing Sheets

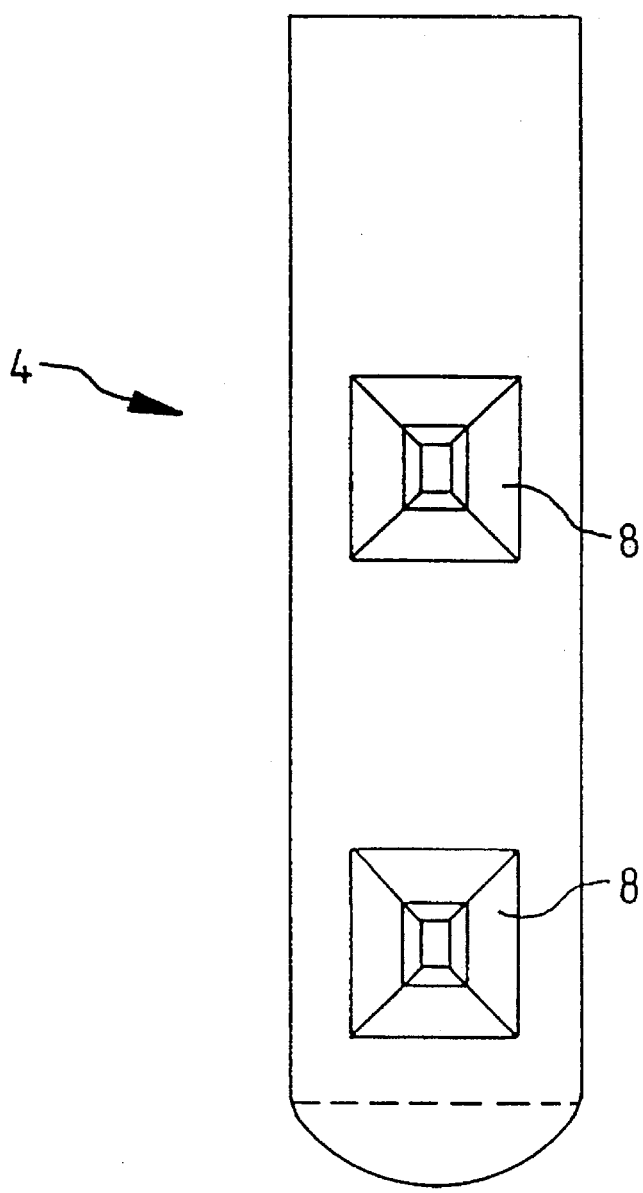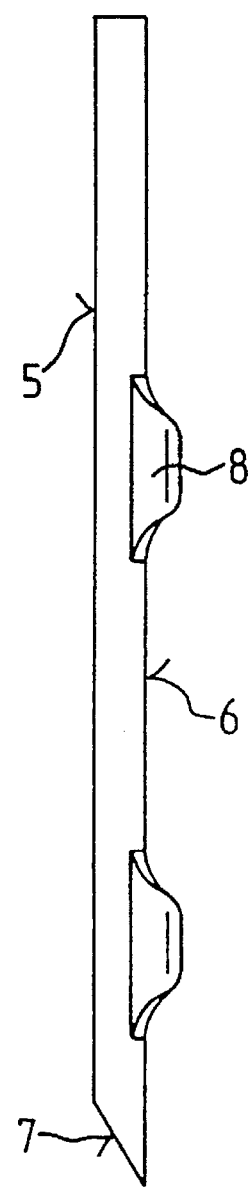

PROCESS FOR PRODUCING A STEEL MOLD FOR CONCRETE PAVING BLOCKS WITH SPACERS

The invention relates to a process for producing a steel mold for concrete paving blocks. The special feature of the concrete paving setts (block) to be produced therewith is constituted by so-called spacers. The latter are understood as being dam-like protrusions which are only a few millimeters thick and, running in the vertical direction, are integrally formed on the side surfaces of the paving setts. In order that, when the paving setts have been laid, the spacers cannot be seen, but are concealed by the sand introduced into the joints, said spacers extend only over the lower vertical region of the molding.

In the case of commercially available multiple-chamber steel molds which are manufactured from a solid steel plate by flame cutting, it is known, for molding the spacers, also to cut corresponding flat grooves into the mold walls. The flat grooves, accordingly, extend over the entire height of the mold wall. Since, however, the spacers, as has been mentioned, are to terminate at a specific level before the upper border of the mold chamber, the groove in the mold wall has to be closed or filled in its upper section.

It is known to achieve this filling by build-up welding in the groove. However, the filling material may protrude to some extent over the groove, i.e. over the inner surface of the mold wall. Such protrusion is subsequently ground away to be flush with the inner surface of the mold wall, with the result that, in this region, the planar inner wall surface is obtained once again. Moreover, the lower end of the built-up material is ground away such that a smooth shoulder merging smoothly into the groove inner surface is produced.

The known process which has been outlined is, understandably, extremely work-intensive. As a result of inaccurate work when finish-grinding the shoulder, the grinding tool may frequently penetrate too deeply (relief=grinding). This results in difficulties when the compacted concrete bodies are demolded. The greatest disadvantage of the known process consists, however, in the fact that, due to the build-up welding, the mold walls are subjected to pronounced heating in certain areas, with the result that the mold warps. In order to eliminate this warping, the entire mold has to undergo renewed heat treatment and, in this arrangement, a reduction in the material hardness has to be accepted.

SUMMARY OF THE INVENTION

The object of the invention is, during the production of the steel molds which have been outlined, to close the grooves for the spacers in a cost-effective manner without impairing the quality (in particular the degree of precision and hardness) of the mold.

Taking as a departure point a process of the type described in the introduction, this object is achieved according to the invention by the steps of flame cutting a steel plate using a flame-cutting jet to form at least one mold chamber; guiding the flame-cutting jet to form at least one groove in a wall of the mold chamber, with the groove defining a cross-section of a spacer; and filling in an upper portion of the groove, by using the following steps: providing a closure platelet having a cross-section corresponding essentially to a cross-section of the groove, and having at least one welding projection formed on a side thereof; placing the closure platelet in the groove with the welding projection projecting into the groove; and welding the closure platelet into the groove using projection welding. In accordance therewith, the basic idea of the invention is that, instead of filling the groove by build-up welding, an appropriately pre-molded steel body (closure platelet) is welded into the groove by projection welding. The closure platelet has, for this purpose, correspondingly shaped and dimensioned welding projections. It is pushed into the groove by the electrode arms of welding tongs. The welding protrusions become plastic by virtue of the precisely set quantum of energy applied and, after completion of the sudden process, the groove being closed in a flush, planar and gap-free manner and, moreover, a neat shoulder is provided. The closure platelet may consist of an unalloyed or low-alloyed steel which is strain-hardened during its production and has the same degree of hardness as the mold material itself.

Virtually all material-removing follow-up is dispensed with. The generation of heat is so low that warping of the mold is ruled out, and the mold thus also has no need of subsequent straightening. The original hardness of the mold remains intact. The precise shape of the closure platelet, which preferably has an inclined planar end surface, also gives rise to a flawless shoulder region, with the result that, when the mold is put into use, the compacted concrete bodies can be satisfactorily demolded.

By virtue of the high degree of automation achieved, the manufacturing time can be permanently reduced and, at the same time, an improvement in the quality of the molds can be obtained.

In order to carry out the process described, projection-welding tongs with a fixed jaw and a movable jaw are proposed. In order to retain the closure platelet, provision is made for a receiving part, which is mounted on a jaw such that it is capable of tilting about a transverse axis of the closure platelet. Consequently, even if the welding tongs are not applied in a precisely parallel manner, the closure platelet reaches its defined end position, in which its planar surface continues the inner surface of the mold wall, with a high degree of precision.

Preferably, a magnet for securing the closure platelet is embedded in the abutment surface of the receiving part for the closure platelet. The receiving part is preferably of a semi-cylindrical shape and slides in a corresponding bearing shell of the jaw, with the result that the tilting axis lies in the planar surface of the closure platelet butting against the receiving part.

BRIEF DESCRIPTION OF THE DRAWINGS

An exemplary embodiment of the invention is explained hereinbelow with reference to the drawings, in which:

FIGS. 4–6 show, on an enlarged scale, three views of a closure platelet.

DETAILED DESCRIPTION OF THE INVENTION

Figure 1:
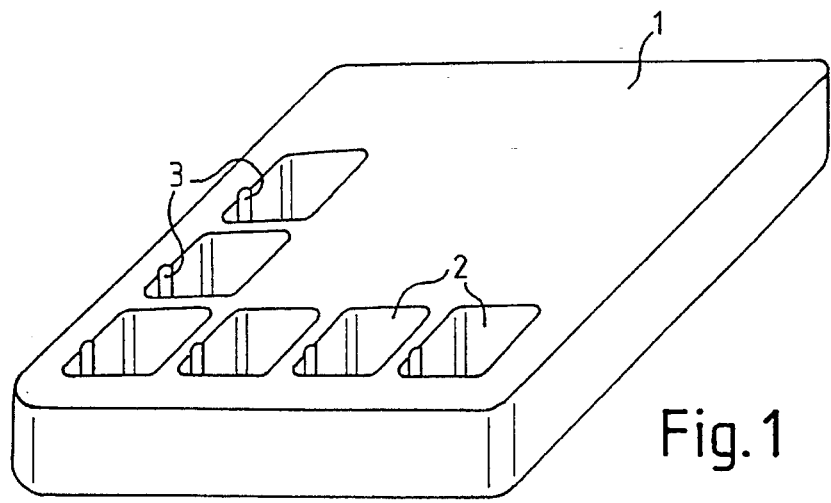
FIG. 1 shows a schematic three-dimensional representation of a multiple-compartment mold, in the partly finished state.
Figure 2:
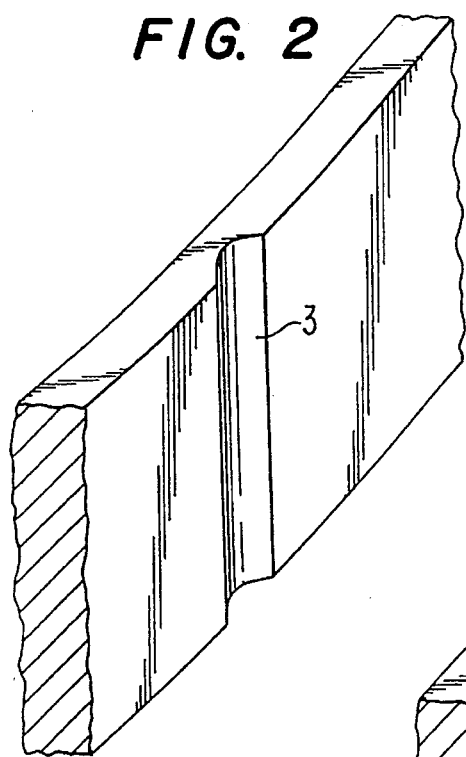
FIG. 2 shows, on an enlarged scale and likewise in a three-dimensional representation, a broken-away piece of a mold wall according to FIG. 1.
Figure 3:
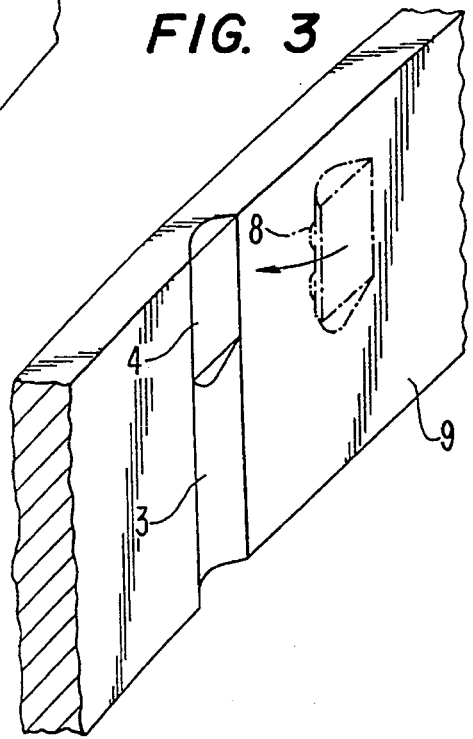
FIG. 3 shows the mold wall according to FIG. 2 with a closure platelet inserted therein.

FIG. 1 shows, as a blank, a partly machined steel plate 1. In order to produce rectangular concrete paving setts blocks, corresponding window openings, which form the mold chambers 2, are cut out of the steel plate by flame cutting. This machining takes place on a numerically controlled flame-cutting machine with an autogenous flame jet being used. The programming is such that the flame-cutting jet occasionally deviates from its straight course and passes through a curve, which results in the rounded grooves 3, which are indicated by way of example. In order to close the upper section of the grooves, in this case one closure platelet 4 is in each case welded in by projection welding. FIG. 3 shows a groove 3 which is closed in this manner with chain-dotted lines additionally indicating the position of the closure platelet before it is welded in.

FIGS. 4 to 6 show a front view, a side view and an end view, respectively of one of the closure platelets 4 used, these views show the platelet at approximately three times its natural size. The platelet is in the form of a strip with a planar surface 5 and a convex surface, and thus with a cross sectional shape which corresponds precisely to that of the groove 3. Of the ends which are cut off at right angles to the longitudinal edges, one has an end surface perpendicular to the longitudinal, and the other has an oblique end surface 7 which forms an obtuse angle with the planar surface 5 of the closure platelet. Integrally formed on the convex surface 6 are two welding projections 8, which are square in outline and may be described as approximately pyramidal in shape, with their tips cut off. During the welding operation, the material quantum of these welding projections 8 becomes plastic to liquid, and is distributed in the groove 3. Correspondingly dimensioning ensures that, in the end, the planar surface 5 of the closure platelet 4 is precisely level with the inner surface 9 (FIG. 3) of the mold chamber. At the lower end of the closure platelet, the planar surface 5 slopes downwards, as is likewise shown in FIG. 3, into the groove via the oblique end surface 7. The resulting oblique shoulder prevents concrete from remaining in the mold at this location and imperfections from being formed on the paving sett.

The closure platelet is a mass-produced article. It consists of an unalloyed or low-alloyed steel and also obtains its shape by cold working. The steel thus attains a high degree of hardness, this hardness with not being impaired by the projection-welding operation, and being equal to the hardness and wear resistance of the mold walls.

Figure 7:
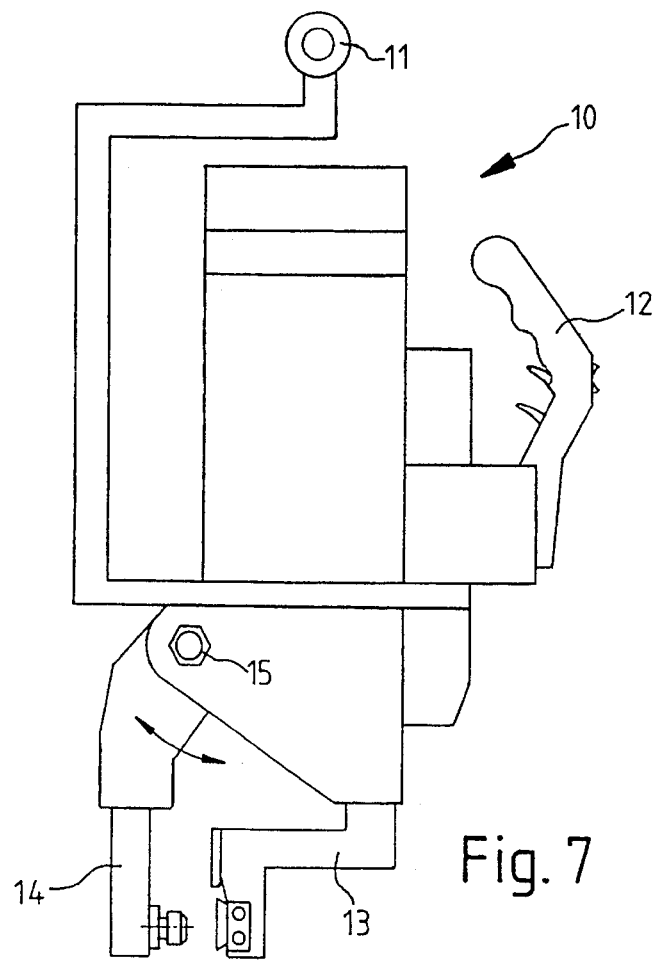
FIG. 7 shows a schematic view of projection-welding tongs.
Figure 8:
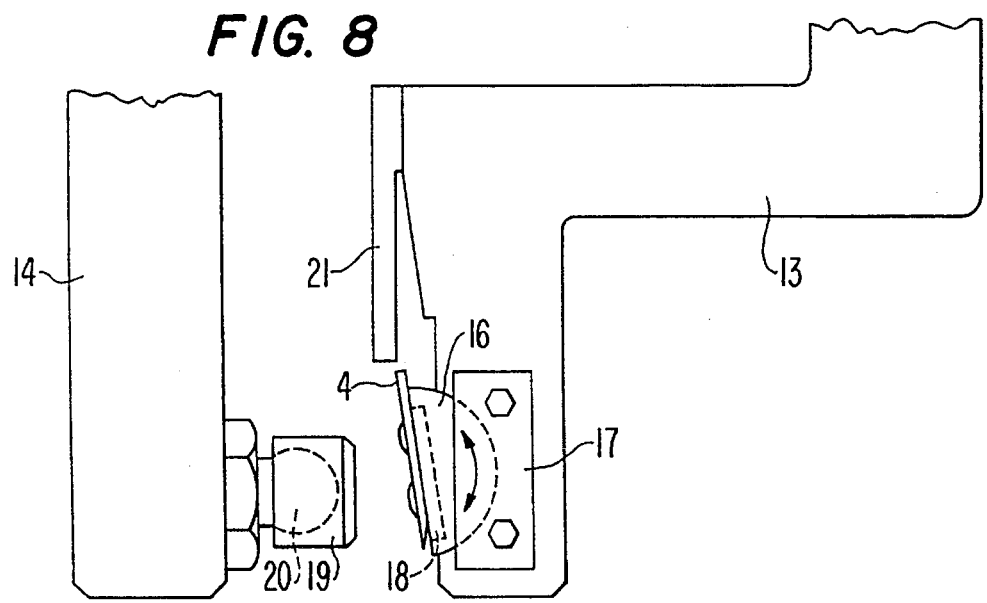
FIG. 8 shows, on an enlarged scale, the electrode arms of the tongs according to FIG. 7.

In order to carry out the projection-welding process, use is made of welding tongs 10 which are known per se, and which are represented in FIG. 7. Welding tongs 10 contain a welding transformer, and the electrical control devices for the precise setting of the welding-current intensity and the current-flow time. The welding tongs are suspended, by means of an eyelet 11 on a drawing apparatus (not shown) with a movable arm, with the result that their weight is compensated. The tongs can be moved in all directions within the operating area in a comparatively easy manner by a handle 12, which also contains operating buttons. At the bottom, the welding tongs exhibit a bent-off fixed electrode arm 13, and a pivotable electrode arm 14 which is mounted at 15. Both electrode arms are water-cooled and, in terms of their geometrical shape and their movable receiving and pressure-exerting parts, are specially configured for this application purpose.

On the fixed electrode arm, a semi-cylindrical copper receiving part 16 is received in a semi-cylindrical bearing shell and is secured against axial displacement, on both sides, by insulating-material plates 17. A closure platelet 4 is positioned with its planar surface against the axis-parallel planar receiving surface of the receiving part 16. The closure platelet is retained by means of a permanent magnet 18 which is embedded in the receiving surface. By virtue of this current-conducting movable retaining arrangement, the closure platelet 4 can be fitted into the groove without obstruction.

On the pivotable electrode arm 14, a copper pressure-exerting piece 19 is mounted on a spherical head 20. In order, when the welding tongs 10 are applied, to bring the closure platelet easily into the vertically correct position, a fork-shaped vertical stop 21 consisting of insulating material is fitted on the fixed electrode arm 13. Its downwardly projecting fork tines are located on both sides of the closure platelet and are positioned on the border of the mold wall.

The operation for fitting a closure platelet 4 takes place in seconds. The platelet is positioned on the receiving part 16 and is immediately secured by the permanent magnet 18. The welding tongs are then fitted, from above, over the mold wall and the vertical stop 21 is positioned on the border of the mold wall. The closure platelet 4 is then fitted into the groove 3, while the pressure-exerting piece 19 butts against the opposite side of the mold wall. By actuating a first trigger element, the tongs are then closed, i.e. the closure platelet 4 is pressed with a high degree of force, into the groove 3 by means of a pneumatic cylinder. The welding operation is then triggered, during which, as the welding projections 8 become plastic, the stored pneumatic forces press the closure platelet into its final position. Thereafter, the welding tongs are opened. A new welding platelet may be fitted immediately and the work continued on the next groove.

I claim:

1. A method of producing a steel mold used for molding concrete paving blocks having spacers, comprising the steps of:

flame cutting a steel plate using a flame-cutting jet to form at least one mold chamber;

guiding the flame-cutting jet to form at least one groove in a wall of the mold chamber, with the groove defining a cross-section of a spacer; and filling in an upper portion of the groove, by performing the following steps:
   providing a closure platelet having a cross-section corresponding essentially to a cross-section of the groove, and having at least one welding projection formed on a side thereof;
   placing the closure platelet in the groove with the welding projection projecting into the groove; and
   projection welding the closure platelet into the groove.

2. The method defined in claim 1, wherein the closure platelet of said providing step is comprised of a strain-hardened unalloyed steel.

3. The method defined in claim 1, wherein the closure platelet of said providing step is comprised of a strain-hardened low-alloyed steel.

4. The method defined in claim 1, wherein the closure platelet of said providing step has a planar side surface, a transverse edge, and a planar oblique surface inclined relative to the planar side surface and around the transverse edge.

5. The method defined in claim 1, further comprising the steps of providing welding tongs having a jaw, and a receiving part mounted on the jaw and being tiltable about a transverse axis of the jaw; and mounting the closure platelet on the receiving part prior to said placing step.

6. The method defined in claim 5, wherein said step of providing welding tongs includes embedding a magnet in an abutment surface of the receiving part; and said mounting step includes securing the closure platelet to the receiving part using the magnet.

7. The method defined in claim 5, wherein said step of providing welding tongs includes forming the receiving part with a semi-cylindrical shape, and providing a bearing shell attached to the jaw for slidably receiving the receiving part, so that the receiving part is tiltable about a tilting axis extending transversely to an abutment surface of the receiving part.

8. The method defined in claim 1, wherein the closure platelet of said providing step is comprised of a strain-hardened unalloyed steel or low-alloyed steel, has an elongate shape, has a planar side surface and a convex side surface, has a planar end surface which forms an obtuse angle with the planar side surface, and includes at least two pyramid-shaped welding projections located on the convex side surface.

9. A method of producing a steel mold used for molding concrete paving blocks having spacers, comprising the steps of:

forming in a steel plate a mold chamber having at least one groove located in a wall thereof, with the groove defining a cross-section of a spacer; and filling in a portion of the groove, by performing the following steps:

providing a closure platelet having a cross-section corresponding essentially to a cross-section of the groove;

placing the closure platelet in the groove; and projection welding the closure platelet into the groove.

* * * * *